United States Patent
Frühauf

(10) Patent No.: US 11,110,394 B2
(45) Date of Patent: Sep. 7, 2021

(54) NOZZLE LANCE, COMBUSTION PLANT AND METHOD FOR EXHAUST GAS TREATMENT

(71) Applicant: RS RITTEL GMBH, Gladbeck (DE)

(72) Inventor: Peter Frühauf, Gladbeck (DE)

(73) Assignee: RS RITTEL GMBH, Gladbeck (DE)

( * ) Notice: Subject to any disclaimer, the term of this patent is extended or adjusted under 35 U.S.C. 154(b) by 132 days.

(21) Appl. No.: 16/482,745

(22) PCT Filed: Feb. 2, 2018

(86) PCT No.: PCT/EP2018/025028
§ 371 (c)(1),
(2) Date: Aug. 1, 2019

(87) PCT Pub. No.: WO2018/141486
PCT Pub. Date: Aug. 9, 2018

(65) Prior Publication Data
US 2019/0351370 A1   Nov. 21, 2019

(30) Foreign Application Priority Data

Feb. 3, 2017   (DE) .................... 10 2017 000 972.4
Feb. 6, 2017   (DE) .................... 10 2017 001 025.0

(51) Int. Cl.
*B01D 53/34*   (2006.01)
*B01D 53/50*   (2006.01)
(Continued)

(52) U.S. Cl.
CPC ........... *B01D 53/79* (2013.01); *B01D 53/346* (2013.01); *B01D 53/504* (2013.01); *B01D 53/56* (2013.01);
(Continued)

(58) Field of Classification Search
CPC .......... B01J 2219/1943; B01J 2219/185; B01J 4/002; B01D 2251/404; B01D 53/90;
(Continued)

(56) References Cited

U.S. PATENT DOCUMENTS 4,462,543 A   7/1984   Yam
4,893,752 A   1/1990   Spink et al.
(Continued)

FOREIGN PATENT DOCUMENTS

CA   2028384       5/1998
CN   205598951 U   9/2016
(Continued)

OTHER PUBLICATIONS

Invitation to Pay Additional Fees and, Where Applicable, Protest Fee for International Application No. PCT/EP2018/025028, dated Apr. 6, 2018.
(Continued)

*Primary Examiner* — Timothy C Vanoy
(74) *Attorney, Agent, or Firm* — Jason H. Vick; Sheridan Ross, PC

(57) ABSTRACT

A nozzle lance for exhaust gas treatment, a combustion plant with nozzle lances for exhaust gas treatment, and a method for exhaust gas treatment in a combustion plant are proposed, whereby an added fluid can be mixed in with the active fluid in or immediately in front of the nozzle lance.

27 Claims, 6 Drawing Sheets

(51) Int. Cl.
  *B01D 53/56* (2006.01)
  *B01D 53/60* (2006.01)
  *B01D 53/79* (2006.01)
  *B05B 7/04* (2006.01)
  *F23J 15/00* (2006.01)

(52) U.S. Cl.
  CPC .............. *B01D 53/60* (2013.01); *B05B 7/045* (2013.01); *B05B 7/0408* (2013.01); *B05B 7/0475* (2013.01); *F23J 15/003* (2013.01); *B01D 2251/2062* (2013.01); *B01D 2251/2067* (2013.01); *B01D 2251/404* (2013.01); *B01D 2251/602* (2013.01); *B01D 2251/604* (2013.01); *B01D 2251/606* (2013.01)

(58) Field of Classification Search
  CPC ............ B01D 2251/2062; B01D 53/79; B01D 2258/0283; B01D 53/56; B01D 2258/0291; B01D 2251/2067; B01D 2251/604; B01D 2251/206; B01D 2251/602; B01D 53/504; B01D 53/346; B01D 53/60; B01D 53/8631; B01D 2251/606; B05B 7/045; B05B 7/0408; B05B 7/0475; F23J 15/003
  See application file for complete search history.

(56) References Cited

U.S. PATENT DOCUMENTS

| | | | |
|---|---|---|---|
| 4,963,329 A | 10/1990 | Burgess et al. | |
| 4,963,330 A * | 10/1990 | Johansson | B01D 53/40 422/168 |
| 5,474,235 A | 12/1995 | Cole et al. | |
| 5,478,542 A * | 12/1995 | Chawla | B01D 53/56 423/235 |
| 5,484,107 A * | 1/1996 | Holmes | B05B 7/0408 239/427.5 |
| 5,536,482 A * | 7/1996 | Diep | B01D 53/56 423/235 |
| 5,676,071 A | 10/1997 | Horler et al. | |
| 7,588,199 B2 | 9/2009 | Huffman | |
| 8,980,206 B2 | 3/2015 | Hamel et al. | |
| 9,168,545 B2 * | 10/2015 | Vidusek | B05B 7/0892 |
| 2005/0002841 A1 | 1/2005 | Moberg | |
| 2009/0121038 A1 | 5/2009 | Wurz | |
| 2011/0150709 A1 | 6/2011 | Neu et al. | |
| 2014/0134086 A1 | 5/2014 | Hamel et al. | |
| 2014/0308186 A1 * | 10/2014 | Messineo | B01D 53/38 423/210 |
| 2014/0356236 A1 | 12/2014 | Yamakaji et al. | |

FOREIGN PATENT DOCUMENTS

| | | | |
|---|---|---|---|
| CN | 109395563 A * | 3/2019 | ............ B01D 53/56 |
| DE | 3935400 C1 | 8/1990 | |
| DE | 4130348 A1 | 3/1993 | |
| DE | 10359150 A1 | 7/2005 | |
| DE | 102008036009 A1 | 10/2009 | |
| DE | 102008036099 A1 | 2/2010 | |
| DE | 102012110962 A1 | 5/2014 | |
| EP | 0079081 A2 | 5/1983 | |
| EP | 2463015 A1 | 6/2012 | |
| EP | 2962743 A1 | 1/2016 | |
| WO | WO 2006/119923 | 11/2006 | |
| WO | WO 2011/077523 | 6/2011 | |
| WO | WO 2020/025381 | 2/2020 | |

OTHER PUBLICATIONS

International Search Report for International Application No. PCT/EP2018/025028, dated Jun. 29, 2018.
Written Opinion for International Application No. PCT/EP2018/025028, dated Jun. 29, 2018.
International Preliminary Report on Patentability for International Application No. PCT/EP2018/025028, dated Aug. 15, 2019.
U.S. Appl. No. 17/262,064, filed Jan. 21, 2021, Frühauf et al.
Invitation to Pay Additional Fees and, Where Applicable, Protest Fee for International Application No. PCT/EP2019/069685, dated Oct. 24, 2019.
International Search Report for International Application No. PCT/EP2019/069665, dated Dec. 18, 2019.
Written Opinion for International Application No. PCT/EP2019/069665, dated Dec. 18, 2019.
International Preliminary Report on Patentability for International Application No. PCT/EP2019/069665, dated Feb. 18, 2021.

* cited by examiner

NOZZLE LANCE, COMBUSTION PLANT AND METHOD FOR EXHAUST GAS TREATMENT

CROSS REFERENCE TO RELATED APPLICATIONS

This application is a national stage application under 35 U.S.C. 371 of PCT Application No. PCT/EP2018/025028 having an international filing date of 2 Feb. 2018, which designated the United States, which PCT application claimed the benefit of German Application No. 10 2017 000 972.4, filed 3 Feb. 2017, and German Application No. 10 2017 001 025.0, filed 6 Feb. 2017, each of which are incorporated herein by reference in their entirety.

The present invention relates to a nozzle lance for exhaust gas treatment according to the preamble of claim 1, a combustion plant according to the preamble of claim 23 or 28 and a method for exhaust gas treatment according to the preamble of claim 37 or 40.

In the present invention, the term "nozzle lance" is preferably to be understood as a device by means of which a fluid can be supplied to an exhaust gas chamber, especially for exhaust gas treatment, preferably wherein the fluid is sprayed or atomized into the exhaust gas chamber or delivered as an aerosol or spray to the exhaust gas chamber. Preferably, for this purpose, the nozzle lance passes through a wall of the exhaust gas chamber, especially horizontally.

Such nozzle lances are preferably used for exhaust gas treatment with bigger combustion plants, especially large combustion plants.

A "combustion plant" or "large combustion plant" in the sense of the present invention is preferably a facility, especially a stationary one, for the burning of any particular materials on a preferably large scale, e.g., a waste incinerator, a power station, or a kiln.

In the present invention, the term "exhaust gas treatment" preferably means the treatment or cleaning of exhaust gases, especially in combustion plants. Quite generally, an exhaust gas treatment can alter or influence the (chemical) composition of the exhaust gas. In particular, chemical compounds may be changed by chemical reactions into other chemical compounds, with certain chemical compounds thus able to be removed (at least partly) from the exhaust gas.

During the combustion process in combustion plants, there arise exhaust gases with a variety of pollutants, especially toxic ones, which makes a cleaning of the exhaust gas necessary. In particular, the allowable quantity of pollutants in the exhaust gas is regulated by law in many countries—for example, by the Federal Pollution Control Act or the implementing regulations of the Federal Pollution Control Act in the Federal Republic of Germany.

Pollutants in the sense of the present invention are especially nitrogen oxides and/or sulfur oxides.

In the present invention, the term "exhaust gas treatment" is preferably to be understood as an exhaust gas cleaning, especially preferably a flue gas denitrification and/or flue gas desulfurization. In flue gas denitrification, nitrogen oxides NOR, especially NO and/or $NO_2$, are at least partly removed from the exhaust gas or flue gas arising during the combustion. In flue gas desulfurization, sulfur-containing compounds or sulfur oxides, especially $SO_2$ and/or $SO_3$, are at least partly removed from the exhaust gas or flue gas arising during the combustion.

It is known that the removal of nitrogen oxides from the exhaust gas can occur through a chemical reaction. Through the addition of ammonia ($NH_3$) or an ammonia solution, where ammonia is dissolved in water, to the nitrogen oxide-containing exhaust gas, the nitrogen oxides from the exhaust gas can react with oxygen and the ammonia solution, so that nitrogen ($N_2$) and water ($H_2O$) are formed as products of the reaction. It is also possible to use a urea solution instead of an ammonia solution for the denitrification.

In similar manner, sulfur oxides can be removed from an exhaust gas containing sulfur oxides by means of a chemical reaction through the addition of calcium oxide or calcium carbonate, especially dissolved in water.

For the exhaust gas treatment or cleaning according to the present invention, an active fluid—i.e., a fluid with an active substance, such as ammonia or urea or a calcium-containing compound—is injected or atomized into the exhaust gas.

In the following, the present invention shall be explained primarily in connection with flue gas denitrification as a preferred example for the exhaust gas treatment. However, the present invention is also analogously suitable for flue gas desulfurization.

The term "atomization" preferably refers to the conversion of one or more fluids into a spray or an aerosol. Atomization preferably occurs through a nozzle, especially where the nozzle is a component with a cross section that changes, especially diminishes, along the flow direction of the fluid.

The dispensing of the spray or fluid from the nozzle lance and/or into an exhaust gas chamber is sometimes also called "injection" in the following. In particular, the terms "injecting" and "dispensing" or terms equivalent to them are synonymous with each other and preferably interchangeable.

Preferably, the active fluid being atomized is liquid and its atomization occurs by means of pressurized gas. Thus, a spray or aerosol is formed with a multitude of droplets of the atomized liquid fluid or active fluid and dispensed into the exhaust gas.

In known combustion plants, a premixed ammonia solution or other suitable liquid is supplied to the exhaust gas by means of nozzle lances for the exhaust gas cleaning or flue gas denitrification.

The combustion plants comprise a tank for the ammonia solution as the active fluid and a tank for an added fluid, such as water. For the premixing, the active fluid and the added fluid are mixed in a desired ratio, so that a fluid mixture results with a particular concentration of the ammonia contained in the active fluid as the active substance. This fluid mixture is then taken by a common supply line to the nozzle lances. This does not allow an optimal exhaust gas treatment, especially in view of increasing requirements or lower limit values.

DE 10 2008 036 009 A1 discloses a device for denitrification of flue gases with injection lances for blowing ammonia water or urea into an interior space of a steam generator. The injection lances are arranged on various levels, and all the injection lances have a closure valve. The closure valves are individually controllable by a central control unit.

From DE 103 59 150 A1 there is known a lance in which liquid urea is mixed with a carrier gas in a mixing zone, before it is dispensed into an exhaust gas stream.

US 2005/0002841 A1 discloses an injection system for exhaust gas treatment, wherein the system comprises multiple coaxially arranged lines. An active fluid being atomized is taken through one of the lines and after emerging from the line it is atomized with a gas supplied through a different line.

DE 10 2012 110 962 A1 discloses a compound nozzle for the injection of a reactant into a furnace chamber. The nozzle has three tubes arranged coaxially to each other for the reactant, a propellant, and an enveloping means. At the outlet of the nozzle, the reactant and the propellant are atomized. The arrangement of the lines is intended to result in the reactant and propellant being enclosed by the enveloping means after emerging from the nozzle.

The problem which the present invention proposes to solve is to enable an optimized exhaust gas treatment.

The above problem is solved by a nozzle lance according to claim 1, a combustion plant according to claim 23 or 28, or a method according to claim 37 or 40. Advantageous modifications are the subject matter of the dependent claims.

A nozzle lance according to the proposal is characterized by the nozzle lance having three feed lines and/or the added fluid being able to be mixed with the active fluid in the nozzle lance.

Thus, in particular, it is possible to adjust or adapt the admixture locally or individually for a single or for each nozzle lance. This accordingly makes possible an optimized exhaust gas treatment or exhaust gas cleaning.

Preferably, the nozzle lance is designed so that a mixing of the active fluid with the added fluid occurs within the nozzle lance and/or shortly before the atomization or injection of the fluid mixture of active fluid and added fluid. In particular, a mixing immediately prior to atomization enables a very short dead time for adapting the mix ratio of added fluid and active fluid to a change in conditions in the exhaust gas chamber, such as a changed temperature and/or pollutant concentration.

A proposed combustion plant, especially a large combustion plant, comprises multiple nozzle lances associated with a common exhaust gas chamber for the atomization of an active fluid by means of pressurized gas for the exhaust gas treatment. In particular, the nozzle lances atomize the active fluid during the operation of the combustion plant into a common exhaust gas chamber.

Moreover, the proposed combustion plant has separate fluid supply lines for an added fluid and the active fluid, in particular wherein the added fluid can be mixed in with the active fluid immediately before or in the nozzle lance. Thus, it is possible in particular to adjust or adapt the admixture locally or individually for a single or for each nozzle lance. This accordingly makes possible an optimized exhaust gas treatment or exhaust gas cleaning.

Alternatively or additionally, the proposed combustion plant comprises a control system, with which inflows of the active fluid, added fluid and/or pressurized gas for individual nozzle lances and/or nozzle lance groups (i.e., multiple nozzle lances) can be adjusted independently of other nozzle lances. Thus, it is possible in particular to adjust or adapt the admixture locally or individually for a single or for each nozzle lance. This accordingly makes possible an optimized exhaust gas treatment or exhaust gas cleaning.

According to a further, also independently realizable aspect, the present invention relates to a combustion plant with an exhaust gas chamber and multiple nozzles or nozzle lances for the injection of a fluid by means of pressurized gas for exhaust gas treatment. The combustion plant has a control system for control of the exhaust gas treatment and (at least) one thermometer for measuring a temperature in the exhaust gas chamber. The control system is preferably designed to control the exhaust gas treatment or the injection or mixing of the fluid dependent on the temperature measured by the thermometer. This makes possible an especially efficient and effective exhaust gas treatment or exhaust gas cleaning.

In particular, the combustion plant or the control system is designed to adjust or to control a quantity and/or concentration of the active fluid and/or the active substance on the basis of or dependent on the temperature, especially as measured by the thermometer. In particular, the combustion plant or the control system is designed to adjust, control or regulate the mix ratio between active fluid and added fluid and/or the concentration or (absolute) quantity of the active substance in the atomized fluid mixture dependent on the measured temperature.

According to one preferred aspect, the combustion plant comprises multiple thermometers and/or the combustion plant is designed to measure the temperature in different zones, such as sectors or levels, especially independently of each other. This makes possible an especially accurate adjustment of the injected fluid to the conditions prevailing in the exhaust gas chamber, especially when the quantity and/or concentration of the active substance introduced by the fluid is accordingly controlled or adjusted independently in the zones, so that an especially efficient and effective exhaust gas cleaning is made possible.

The combustion plant is preferably designed to change or adapt the quantity or concentration of the active substance in the fluid or fluid mixture that is atomized or dispensed into the exhaust gas chamber in less than 1 s, preferably less than 0.1 s, especially preferably less than 0.01 s, i.e., with a very short dead time after the measuring of the temperature. In this way, an especially rapid adjustment and thus a very efficient and effective exhaust gas cleaning can be accomplished.

In one proposed method for exhaust gas treatment in a combustion plant, the active fluid and the added fluid are taken separately to the nozzle lances, whereby the added fluid is mixed in with the active fluid in or immediately before the nozzle lances. Thus, in particular, it is possible to adjust or adapt the admixture locally or individually for a single or for each nozzle lance. This accordingly makes possible an optimized exhaust gas treatment or exhaust gas cleaning.

Alternatively or additionally, in one proposed method, the inflows of the added fluid, active fluid and/or pressurized gas are adjusted for one or more nozzle lances independently of other nozzle lances. Thus, in particular, it is possible to adjust or adapt the admixture locally or individually for a single or for each nozzle lance. This accordingly makes possible an optimized exhaust gas treatment or exhaust gas cleaning.

According to a further, also independently realizable aspect, the present invention relates to a method for exhaust gas treatment, wherein a fluid is injected by means of pressurized gas through multiple nozzles or nozzle lances into a common exhaust gas chamber of a combustion plant. Preferably, in this method, a temperature is measured in the exhaust gas chamber and a quantity or concentration of the active substance in the atomized fluid or fluid mixture is adjusted or controlled dependent on the measured temperature. This makes possible an optimized exhaust gas treatment.

Preferably, the quantity or concentration of the active substance is adjusted dependent on the temperature, in particular increased as the temperature rises. Preferably, however, this is done (only) in a first temperature range, preferably between around 800° C. and around 980° C. Thus, in particular, the injection of excessive active substance and hence a fouling of the combustion plant or the exhaust gas chamber are avoided.

Alternatively or additionally, the quantity or concentration of the active substance can be kept at least substantially constant as the temperature rises. Preferably, this is done in a second temperature range, which in particular is different from the first temperature range and/or does not overlap with the first temperature range or border on the first temperature range. Preferably, the second temperature range extends from around 980° C. to around 1040° C. This makes possible an optimized exhaust gas treatment.

Alternatively or additionally, the quantity or concentration of the injected active substance is reduced upon reaching or surpassing a limit temperature. It is also possible for no active substance to be injected upon reaching or surpassing the limit temperature. The limit temperature is preferably at least around 980° C., preferably at least around 1000° C., especially preferably at least around 1040° C. This can prevent active substance from being burned or oxidized and adding to the pollutant emission of the combustion plant instead of a reduced pollutant emission.

In general, it is advantageous if the total quantity of the fluid or fluid mixture supplied to the nozzles or nozzle lances or the volume flow of the atomized fluid or fluid mixture is kept at least substantially constant. Preferably, the total quantity of the fluid supplied to the nozzles or nozzle lances or the volume flow of the atomized fluid or fluid mixture is independent of the mix ratio between added fluid and active fluid or independent of the quantity or concentration of the active substance. This is beneficial to an optimized exhaust gas treatment.

The aforementioned features of the present invention as well as the aspects and features of the present invention emerging from the claims and the following description can basically be realized independently of each other, but can also be realized in any given combination.

Further aspects, benefits features and attributes of the present invention will emerge from the claims and the following description of preferred embodiments with the aid of the drawing.

In the figures, which in some cases are only schematic and not true to scale, the same reference numbers are used for the same or similar parts and components, with corresponding or comparable attributes and benefits able to be achieved even if no description is repeated.

Figure 1:
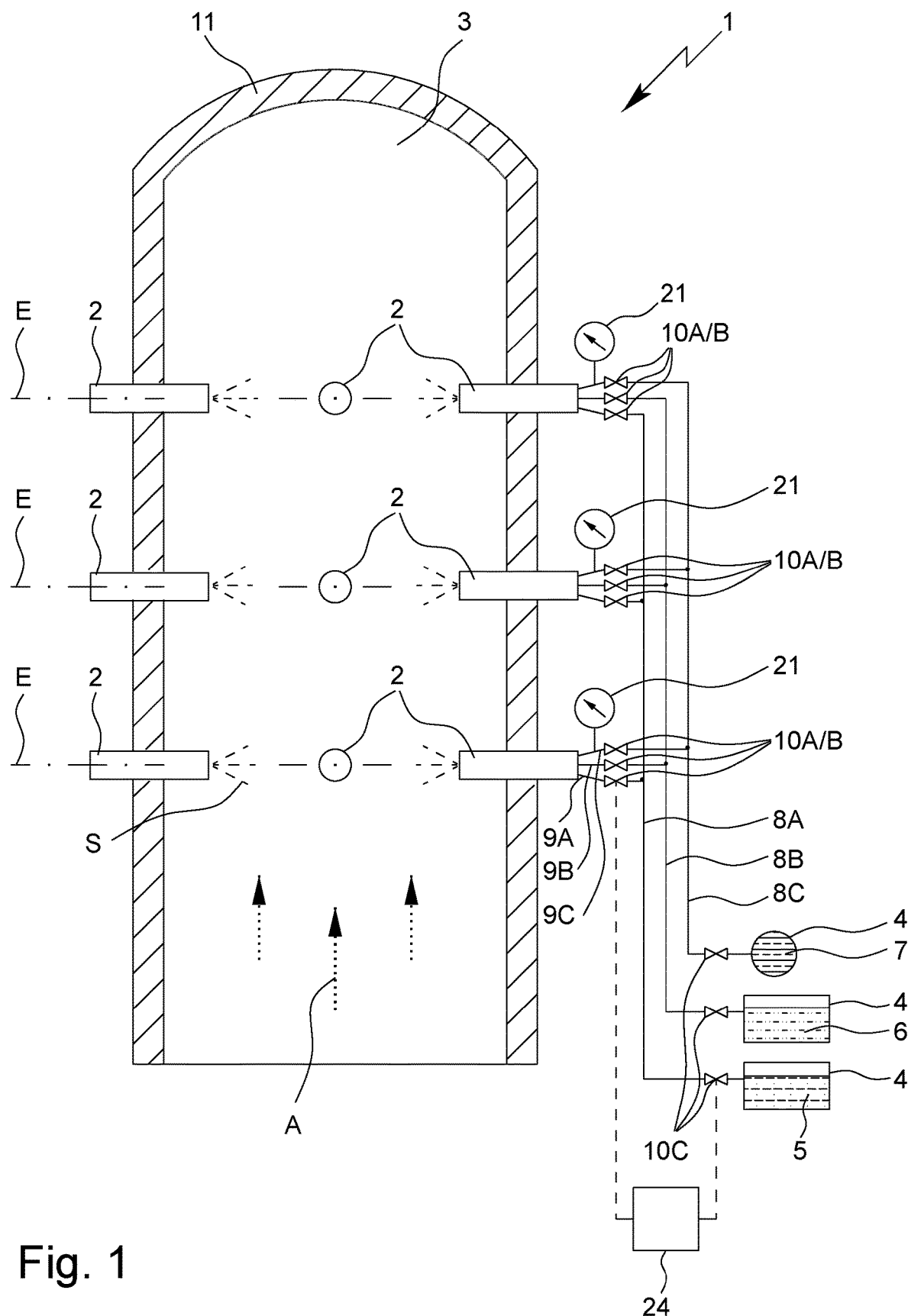
FIG. 1 shows a schematic representation of a proposed combustion plant.

FIG. 1 shows a proposed combustion plant 1 with multiple proposed nozzle lances 2. The combustion plant 1 is preferably a large combustion plant. The nozzle lances 2 are associated with a preferably common exhaust gas chamber 3 of the combustion plant 1.

The combustion plant 1 may also have multiple exhaust gas chambers 3, especially ones which are structurally separated.

Preferably, the combustion plant 1 or the exhaust gas chamber 3 or each exhaust gas chamber 3 comprises a smokestack (not shown). The smokestack preferably forms a part, a section, or a zone of the exhaust gas chamber 3.

Preferably, the nozzle lances 2 are arranged in different, especially horizontal, levels E of the common exhaust gas chamber 3, which extends vertically in particular.

Preferably, the nozzle lances 2 arranged in a common level E form a nozzle lance group, or each stage or level E comprises a nozzle lance group.

Each level E or nozzle lance group preferably comprises more than two or three and/or fewer than ten or eight nozzle lances 2. It is also possible for different levels E or nozzle lance groups to have different numbers of nozzle lances 2.

Preferably, the combustion plant 1 comprises multiple tanks 4 or other supply facilities for an active fluid 5, an added fluid 6, and a pressurized gas 7. A group of tanks 4 may also be associated with each exhaust gas chamber 3.

Preferably, the active fluid 5 is a liquid, especially an ammonia solution, urea solution, or other liquid.

Especially preferably, the active fluid 5 comprises an active substance such as ammonia, urea, or the like, which is suitable to or provided in particular for the treatment or cleaning of exhaust gas A.

Preferably, the added fluid 6 is a liquid, especially water. The added fluid 6 is mixed in with the active fluid 5 as needed.

Preferably, pressurized air is used as the pressurized gas 7.

Preferably, the combustion plant 1 comprises one or more compressors to generate the pressurized gas 7 or the pressurized air (likewise not shown in the figures).

The combustion plant 1 preferably comprises separate supply lines 8 in order to supply the nozzle lances 2 or groups of nozzle lances with the active fluid 5, the added fluid 6, and the pressurized gas 7, especially in order to connect the tanks 4 fluidly to the nozzle lances 2.

In particular, the combustion plant 1 comprises a supply line 8A for the active fluid 5, a supply line 8B for the added fluid 6, and a supply line 8C for the pressurized gas 7.

Preferably, each of the supply lines 8A, 8B, 8C is a supply line 8.

The combustion plant 1 preferably comprises one or more pumps (not shown in the figures), with which the active fluid 5 and/or the added fluid 6 can be pumped from the tanks 4 or other supply equipment through the supply lines 8 to the nozzle lances 2.

Preferably, each nozzle lance 2 or nozzle lance group can be supplied by the three supply lines 8A, 8B and 8C and/or feed lines 9, especially correspondingly separated feed lines 9A, 9B and 9C, with the active fluid 5, added fluid 6, and pressurized gas 7.

Preferably, each of the feed lines 9A, 9B, 9C is a feed line 9.

Especially preferably, each nozzle lance 2 or nozzle lance group comprises separate feed lines 9A, 9B, and 9C for the feeding or supplying of the active fluid 5, added fluid 6, and pressurized gas 7. The feed lines 9 are only suggested in FIGS. 1 and 2 and are shown more clearly in FIGS. 3 and 4, which will be discussed later on.

Preferably, the inflows of active fluid 5, added fluid 6, and/or pressurized gas 7 to the individual nozzle lances 2 or nozzle lance groups can be adjusted or controlled, adapted, metered, or regulated by means of corresponding valves 10. In the following, the term "adjustable" shall be used for simplicity, even though only a onetime adjustment or adaptation may be involved, but in particular an (ongoing) control and possibly regulation should also be included.

The valves 10 are associated with the supply lines 8, in particular to enable individual adjustability. Preferably, each supply line 8 or feed line 9 has a valve 10.

In particular, at least every supply line 8A and 8B or feed line 9A and 9B for the active fluid 5 and added fluid 6 and/or every nozzle lance 2 or at least every nozzle lance group is respectively associated with an independently adjustable or controllable or regulable valve 10. The same holds also preferably for the third supply line 8C of feed line 9C for the pressurized gas 7, as indicated schematically in FIG. 1.

Figure 2:
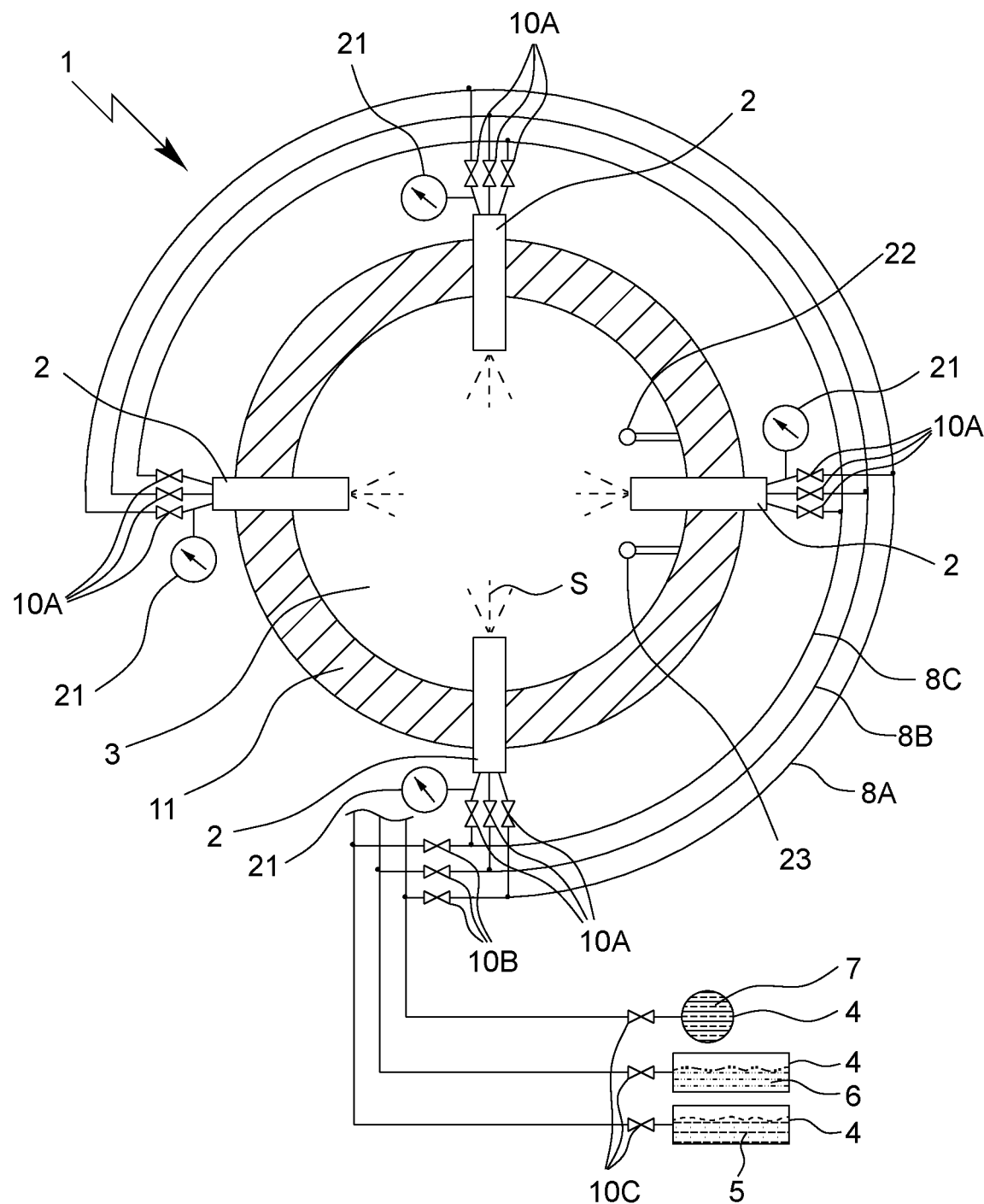
FIG. 2 shows a schematic section through an exhaust gas chamber of the combustion plant in a level with nozzle lances.

FIG. 2 shows in a schematic horizontal section the exhaust gas chamber 3 in a stage or level E with multiple nozzle lances 2, i.e., with a nozzle lance group. FIG. 2 likewise indicates the preferred supplying of the nozzle lance 2 or nozzle lance group via the supply lines 8 with the active fluid 5, added fluid 6, and pressurized gas 7.

The combustion plant 1 preferably comprises first valves 10A and/or second valves 10B as well as optional third valves 10C.

Preferably, each of the valves 10A, 10B, 10C is a valve 10.

The first valves 10A are preferably associated with a respective nozzle lance 2. The first valves 10A are preferably arranged in, on, or immediately upstream from the respective nozzle lance 2.

In regard to an associated nozzle lance 2, a first valve 10A is preferably arranged in the corresponding supply line 8A or feed line 9A or at its transition and a further first valve 10A is arranged in the supply line 8B or feed line 9B or its transition and an additional first valve 10A (especially in the form of a pressure regulator or reducing valve) is optionally arranged in the supply line 8C or feed line 9C or its transition.

Preferably, the inflows of the fluids 5, 6 and/or pressurized gas 7 can be adjusted or metered for individual nozzle lances 2 and/or nozzle lance groups by the valves 10A, especially preferably independently of other nozzle lances 2.

The valves 10A may be arranged in or immediately before the nozzle lance 2. In particular, the valves 10A are arranged at a distance of less than 50 cm or 100 cm from the nozzle lance 2.

In this way, a precise determination, especially a measurement and/or control of the inflow or the inflow quantities of the active fluid 5, the added fluid 6, and/or the pressurized gas 7 to the nozzle lance 2 is made possible.

The alternatively or additionally provided second valves 10B are preferably associated with the different stages or levels E or nozzle lance groups or respective supply rings.

In regard to an associated level E or nozzle lance group, preferably one second valve 10B is arranged in the corresponding supply line 8A or feed line 9A or at its transition and a further second valve 10B is arranged in the supply line 8B or feed line 9B or its transition and optionally an additional second valve 10B (especially in the form of a pressure regulator or reducing valve) is arranged in the supply line 8C or feed line 9C or its transition.

Preferably, the inflows of the fluids 5, 6 and/or the pressurized gas 7 can be adjusted or metered for each level E or nozzle lance group separately or individually by the valves 10B, i.e., by levels or by groups.

The third valves 10C are optionally provided and preferably situated upstream from riser lines or immediately after or in the vicinity of the tanks 4.

The valves 10 are preferably electronically or otherwise adjustable, controllable or regulable.

The valves 10 associated with the first and second supply lines 8A and 8B or feed lines 9A and 9B are preferably designed as ball valves or regulating ball valves. In addition or alternatively, they may be check valves or valves with a check function.

The valves 10 associated with the third supply lines 8C or feed lines 9C for the pressurized gas 7 are preferably designed as pressure reducers and/or pressure regulating valves for adjusting, controlling, or regulating the pressure of the pressurized gas 7.

The other valves 10 are preferably designed to adjust, control, or regulate or throttle the fluid stream, especially preferably the liquid streams or the volume flow or mass flow. Accordingly, the volume flow or mass flow of the active fluid 5 and added fluid 6 which is taken to the individual nozzle lances 2 or nozzle lance groups is individually adjusted, controlled, or regulated, as proposed.

The valves 10 can adjust the inflows and/or pressures, especially of the active fluid 5, the added fluid 6, and/or the pressurized gas 7, optimally for the exhaust gas cleaning. In this way, an especially efficient and/or economical and thus cost-effective exhaust gas cleaning can be accomplished. In particular, the squandering of active substance by adding unnecessarily large quantities of active substance is thus prevented.

In particular, different valves 10 of the combustion plant 1 may have different designs.

The exhaust gas chamber 3 is preferably bounded by a wall 11 and/or situated on the inside of the wall 11.

The exhaust gas chamber 3 or the wall 11 may, as shown in FIG. 2, have a round, especially a circular or elliptical, cross section in the plane E. However, any other shape is also possible here, especially a square, rectangle, or other polygonal cross section.

Preferably, the wall 11 is thermally insulated, especially preferably so that during operation of the combustion plant 1 the temperature on the outside of the wall 11 is significantly less than that on the inside of the wall 11 or in the exhaust gas chamber 3. In particular, the temperature T in the exhaust gas chamber 3 may be several 100° C. to over 1000° C. and/or the temperature on the outside of the wall 11 or outside the exhaust gas chamber 3 is preferably less than 50° C. or 30° C.

The nozzle lances 2 may also be provided with thermal insulation, especially so that the temperature in the nozzle lance 2 is less than 50° C. or 30° C.

Preferably, the nozzle lances 2 are arranged at least substantially in or within the wall 11, and/or the nozzle lances 2 protrude into the exhaust gas chamber 3.

Preferably, the nozzle lances 2 run slanted or transversely, especially preferably at least substantially perpendicular to the wall 11. In departure from the representation in the figures, however, it may also be especially preferable for the nozzle lances 2 to be arranged not at a right angle, but instead "tangentially" or at an acute angle to the wall 11 or parallel to the wall 11. Alternatively or additionally, the nozzle lances 2 may be oriented horizontally or inclined to the horizontal, especially so that the nozzles 13 of the nozzle lances 2 point upward or downward at a slant.

In particular, the nozzle lance 2 is elongated and/or tubular in configuration. The nozzle lance 2 preferably has an axis of symmetry or a longitudinal axis L.

Preferably, the nozzle lance 2 has a nozzle head 12. The nozzle head 12 is preferably arranged at an axial end of the nozzle lance 2 or an end protruding into the exhaust gas chamber 3.

The nozzle head 12 is preferably arranged straight on the nozzle lance 2, but it may also be arranged slanted or transversely, especially at right angles to the nozzle lance 2.

The nozzle head 12 comprises at least one nozzle 13 or nozzle opening 13A (shown in FIGS. 3 and 4), in order to generate or dispense during operation an aerosol or spray S from the active fluid 5 with optionally added fluid 6, as indicated schematically.

Preferably, the principal spraying direction of the nozzle 13 is straight or in the longitudinal axis L or slanted to this.

In particular, the nozzle lance 2 or the nozzle head 12 may protrude from the wall 11 and/or protrude into the exhaust gas chamber 3.

The length of the nozzle lance 2 is preferably more than 30 cm or 40 cm, especially preferably 60 cm or more, and/or less than 140 cm or 120 cm, especially preferably less than 100 cm or 80 cm.

The length of the section of the nozzle lance 2 and/or nozzle head 12 protruding into the exhaust gas chamber 3 or protruding out from the wall 11 along the longitudinal axis L is preferably more than 10 cm or 20 cm and/or less than 40 cm or 30 cm. However, it is also possible for the nozzle lance 2 or the nozzle head 12 to only protrude from the wall 11 by less than 10 cm or not at all, or for the length of the section protruding from the wall 11 to be less than 10 cm or be 0 cm.

The nozzle lances 2—especially from one group or level E—may be arranged on different, especially opposite, sides of the exhaust gas chamber 3. In particular, the (cross sectional) area sprayed by nozzle lances 2 in this way can be as large as possible and/or the spraying can be as homogeneous as possible.

Figure 3:
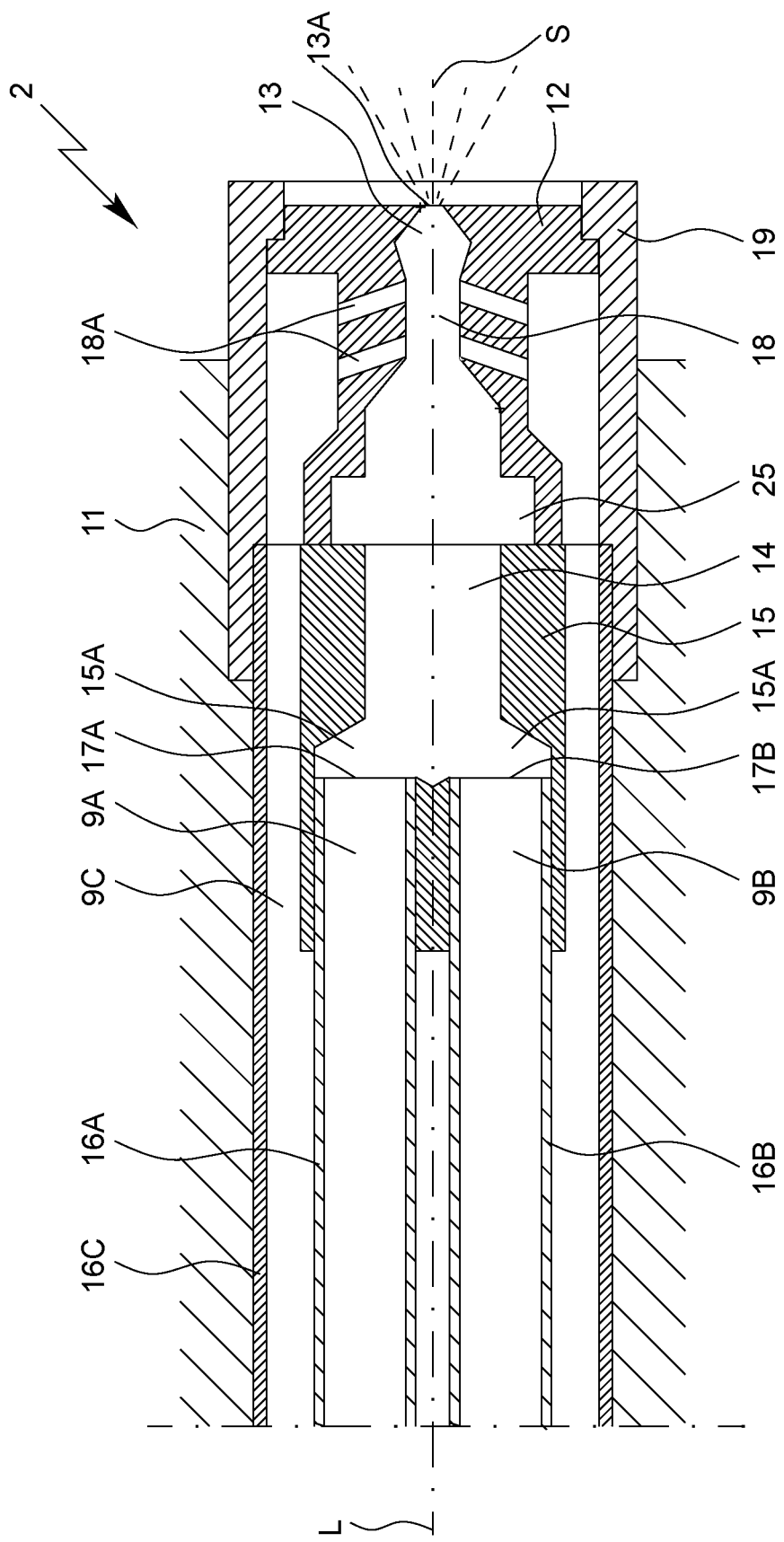
FIG. 3 shows a schematic section of a proposed nozzle lance according to a first embodiment.

FIG. 3 shows a section of the proposed nozzle lance 2 along the longitudinal axis L according to a first embodiment.

Preferably, the nozzle lance 2 is designed for the atomization of the active fluid 5 and optionally added fluid 6 by means of pressurized gas 7. FIG. 3 does not show the fluids 5, 6 or the pressurized gas 7, but the resulting aerosol or spray S is indicated.

In particular, the nozzle lance 2 serves for exhaust gas treatment, most especially preferably for exhaust gas cleaning and/or flue gas denitrification or flue gas desulfurization, especially in combustion plants 1.

Preferably, the nozzle lance 2 comprises three feed lines 9, i.e., in particular feed line 9A for the active fluid 5, feed line 9B for the added fluid 6, and feed line 9C for the pressurized gas 7.

Preferably, the feed lines 9 run along and/or parallel to the longitudinal axis L in the nozzle lance 2.

The feed lines 9, especially feed lines 9A, 9B, may run or be situated alongside each other, especially parallel to and/or at a spacing from the longitudinal axis L, and/or coaxially to each other.

The nozzle lance 2 is preferably configured such that the added fluid 6 can be mixed in with the active fluid 5 in the nozzle lance 2.

The feed line 9A and/or the feed line 9B preferably run inside the pressurized gas feed line 9C, especially such that the feed lines 9A, 9B are inner feed lines 9 and/or the pressurized gas feed line 9C is an outer feed line 9. The pressurized gas feed line 9C thus preferably encloses the other feed lines 9.

It is also possible for the nozzle lance 2 to have an outer conduit or an outer tube, which surrounds or forms the feed lines 9, especially the pressurized gas feed line 9C. In particular, the outer conduit may be configured such that the nozzle lance 2 or parts of the nozzle lance 2 situated inside the outer conduit are protected against damage, e.g., due to mechanical effects, the effect of heat, and/or ingress of fluid.

The outer conduit may also be fashioned as a guide for the nozzle lance 2.

Preferably, the nozzle lance 2 has mixing zone 14. Preferably, the mixing zone 14 is situated in the middle or centrally in the mixing piece 15 and/or to the longitudinal axis L.

The mixing zone 14 is preferably formed by a space or area, especially one formed or situated entirely inside the nozzle lance 2.

Preferably, the first feed line 9A and the second feed line 9B emerge into the mixing zone 14 or the first feed line 9A and the second feed line 9B end in the mixing zone 14. Preferably, the mixing zone 14 is formed or situated downstream or at an outlet end of the feed line(s) 9A and/or 9B.

Preferably, the mixing zone 14 has a larger (flow) cross section than the first feed line 9A and/or the second feed line 9B.

Preferably, the first feed line 9A and the second feed line 9B are fluidly interconnected in or by the mixing zone 14. Preferably, the third feed line 9C is not connected directly to the mixing zone 14.

Preferably, the mixing zone 14 serves for the optional mixing of the added fluid 6 in with the active fluid 5. In particular, a (liquid) fluid mixture can be generated or produced from the active fluid 5 and added fluid 6 in the mixing zone 14.

Preferably, the fluid mixture thus comprises the active fluid 5 and/or the added fluid 6.

Preferably, the mixing zone 14 is formed or situated upstream from the nozzle head 12 and/or the nozzle 13 and/or an atomization zone 18, especially shortly or immediately before it.

Preferably, the mixing zone 14 is spaced away from the lance end or the nozzle 13 or nozzle opening 13A, and/or situated entirely inside the nozzle lance 2.

Preferably, the spacing between the mixing zone 14 and the nozzle 13 and/or nozzle opening 13A of the nozzle lance 2 is at most a few centimeters. Especially preferably, however, the spacing between the mixing zone 14 and the nozzle 13 or nozzle opening 13A is as small as possible, for example around 1 cm.

In the mixing zone 14, the active fluid 5 and the added fluid 6 are mixed together to form a stream, preferably by swirling and/or bringing them together, with a static mixer optionally used or formed. Alternatively, the added fluid 6 is mixed in with the active fluid 5 or vice versa, preferably in a radial manner. Preferably, no atomization of the (liquid) fluid mixture of the active fluid 5 and the added fluid 6 occurs in the mixing zone 14.

Especially preferably, the concentration of the active substance in the fluid mixture can be adjusted or altered, especially decreased, through the mixing process.

However, it is also possible for no added fluid 6 to be mixed in with the active fluid 5 during operation of the nozzle lance 2. This may be advantageous, e.g., when the inflow of the active substance required for the exhaust gas treatment to the exhaust gas chamber 3 can or should be realized solely by the dispensing or spraying or atomizing of the active fluid 5 into the exhaust gas chamber 3. This is the case when the maximum possible concentration of the active substance, namely the concentration of the active substance in the active fluid 5, is being used for the exhaust gas treatment.

Alternatively or additionally, it is possible to operate the nozzle lance 2 only with added fluid 6, without spraying or atomizing the active fluid 5 or the active substance into the exhaust gas chamber 3. This enables in particular a moisture enrichment and/or cooling of the exhaust gas A or flue gas/combustion gas for so-called "flue gas conditioning."

Alternatively, it is also possible for the added fluid 6 to contain another active substance and for the ratio of the two active substances to be influenced accordingly by the mix ratio of the fluids 5 and 6.

Thanks to the mixing zone 14 and the optional mixing of the added fluid 6 in or immediately in front of the nozzle lance 2, it is possible for the desired quantities of active fluid 5 and added fluid 6 to be atomized as exactly as possible under especially optional pressure conditions of the pressurized gas 7. Furthermore, a separate adjusting or controlling of each nozzle lance 2 is possible in this way.

Preferably, the fluids 5 and 6 are first mixed together in the mixing zone 14 and the pressurized gas 7 is not added until later, i.e., somewhat downstream.

Preferably, the (complete) mixing of the fluid mixture occurs also/only during the atomization.

Preferably, the mixing zone 14 borders on the nozzle head 12 and/or the mixing zone 14 extends, at least partly, into the nozzle head 12.

The nozzle lance 2 preferably comprises a mixing piece 15. Preferably the mixing piece 15 forms or comprises the mixing zone 14.

Preferably, the mixing piece 15 also partially forms or comprises the feed lines 9A and 9B.

Preferably, the nozzle lance 2 comprises two tubes 16A and 16B, which form the feed lines 9A and 9B. Preferably, the tubes 16A, 16B are connected at the outlet end to the mixing piece 15.

At the inlet end, the tubes 16A and 16B are attached or can be attached to the supply lines 8A and 8B or first valves 10A.

Preferably, the tubes 16A, 16B are plugged or welded into the mixing piece 15, especially in such a way that tight fluid connections are produced each time.

Preferably, the feed lines 9A and 9B or the tubes 16A and 16B emerge by openings 17A, 17B into the mixing zone 14 or into the mixing piece 15. Optional ducts 15A of the mixing piece 15 can then convey the fluids 5 and 6 into the mixing zone 14.

The mixing piece 15 is preferably formed by a component that is set into or can be set into the nozzle lance 2, being optionally removable or interchangeable, for example in order to adapt the flow resistances or mixing properties.

The mixing piece 15 can be inserted into the nozzle head 12 or screwed together with the nozzle head 12, and/or can form a structural unit with the nozzle head 12 or form or comprise the nozzle head 12. Preferably, the mixing piece 15 is fluidly connected to the nozzle head 12 in tight or pressure-tight manner.

Preferably, the nozzle lance 2 or the nozzle head 12 comprises an atomization zone 18. Preferably the atomization zone is fluidly connected—especially directly or via an intermediate or swirling zone 25—to the mixing zone 14 and/or to the pressurized gas feed line 9C.

The atomization zone 18 in the exemplary representation is preferably situated or formed in the nozzle body or head 12 and/or between the mixing zone 14/mixing piece 15 and the nozzle opening 13A.

Figure 4:
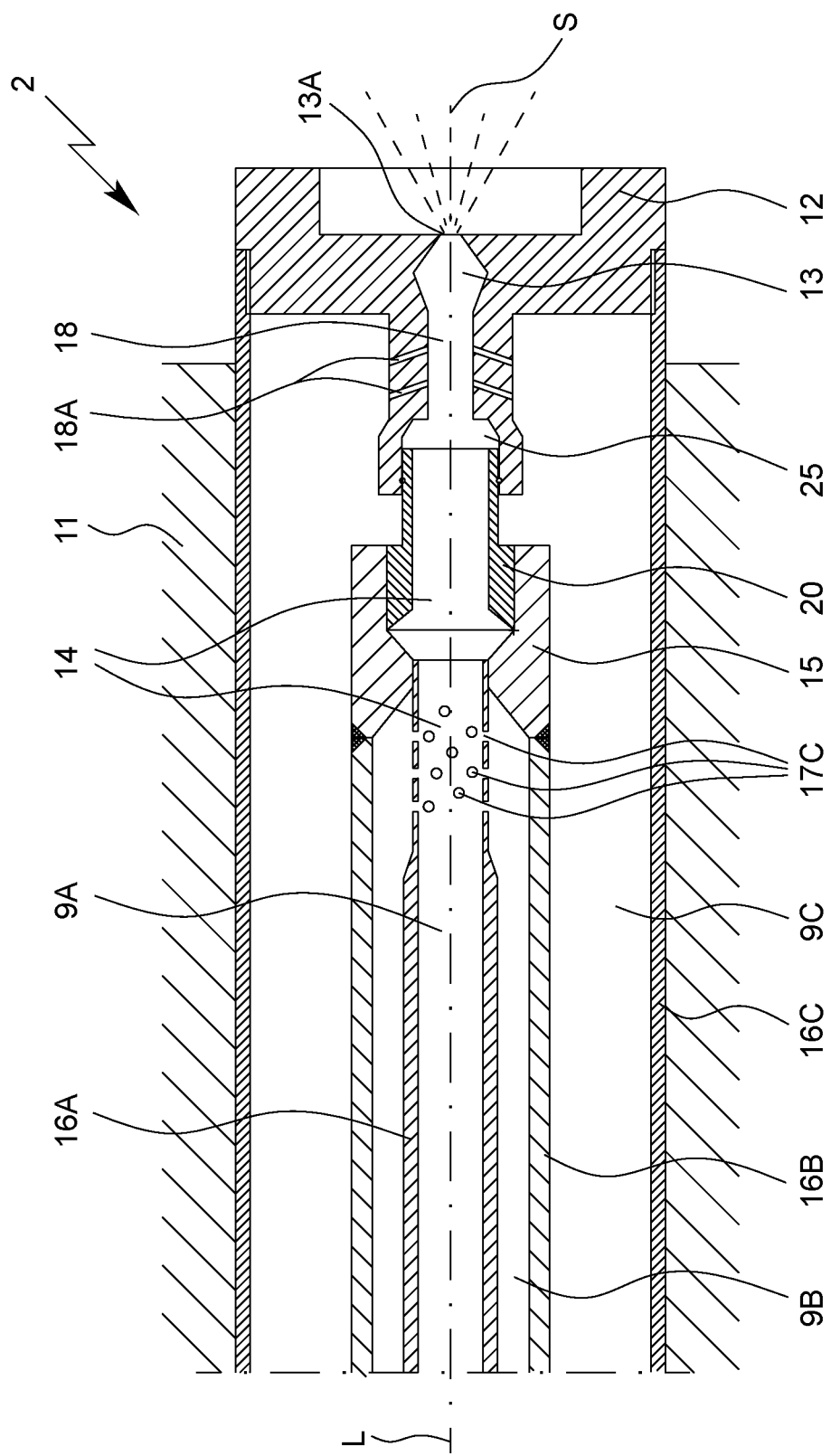
FIG. 4 shows a schematic section of a proposed nozzle lance according to a second embodiment.

Alternatively, the atomization zone 18 may also be situated or formed in the mixing piece 15 or a different or separate component, such as a connection piece 20 (second embodiment per FIG. 4).

The feeding or injection of pressurized gas 7 into the atomization zone 18 preferably occurs via one or more boreholes or feeds 18A, as indicated in FIG. 3. Preferably, the pressurized gas feed line 9C is fluidly connected by means of the feeds 18 to the atomization zone 18. In particular, the feeds 18A run at a slant to the longitudinal axis L and/or from the outside to the inside or radially.

The feeds 18A are preferably situated downstream from the mixing zone 14.

The atomization zone 18 is preferably situated downstream from the mixing zone 14 and/or upstream from the nozzle 13 or nozzle opening 13A.

Preferably, the mixing zone 14 and the third feed line or pressurized gas feed line 9C are fluidly connected to each other in or via the atomization zone 18.

Further preferably, the atomization zone 18 is only indirectly connected or attached to the feed lines 9A, 9B, especially through or via the mixing zone 14.

Preferably, the pressurized gas 7 is supplied to or mixed in with the active fluid 5 or the fluid mixture in the atomization zone 18, especially through the feeds 18A.

The atomization zone 18, the nozzle 13, and/or the nozzle head 12 are preferably situated or formed downstream and/or at the outlet end of the mixing zone 14, mixing piece 15, and/or intermediate or swirling zone 25.

The nozzle head 12 comprises a nozzle 13 or multiple nozzles 13 or forms said nozzles.

The nozzle head 12, the atomization zone 18, and/or the nozzles 13 are thus designed for the atomization of the active fluid 5 or fluid mixture, especially together with or by the pressurized gas 7.

Preferably, the nozzle lance 2 is designed such that at first a mere blending of the liquid active fluid 5 and liquid added fluid 6 occurs in the mixing zone 14, and only then or downstream is the pressurized gas 7 supplied to the fluid mixture of active fluid 5 and added fluid 6 (in the atomization zone 18) and a liquid/gas mixture formed, i.e., only then in the atomization zone 18 and/or afterwards (possibly not until or additionally in the nozzle 13) does an atomization occur.

Preferably, the atomization is performed into the exhaust gas chamber 3, especially preferably at least substantially horizontally.

The nozzle 13 is preferably designed to generate a conical spray S, especially at least approximately in the shape of a solid cone or hollow cone, so that zones above and/or below the spraying nozzle lance 2 are also sprayed. However, it is also possible for the nozzle 13 to be designed to generate the spray S as a flat spray, so that the spray S is sprayed at least substantially in a preferably horizontal plane E.

Preferably, the atomization zone 18 is situated in the middle or centrally in the nozzle lance 2, in particular such that the atomization zone 18 comprises or surrounds the longitudinal axis L.

Preferably, the atomization zone 18 comprises the nozzle 13.

Preferably, the cross section of the atomization zone 18 or the nozzle 13 first increases in the direction of the outlet or the exhaust gas chamber 3 and then diminishes once more, or the reverse. The atomization zone 18 or nozzle 13 thus preferably has two adjoining zones, where the cross section increases in one zone and decreases in the other zone. In particular, the nozzle 13 may thus be used as a Laval nozzle or the nozzle 13 is designed as a Laval nozzle.

At its outlet end, the nozzle lance 2 preferably has a single or precisely one nozzle 13 or opening 13A or an outlet, where in particular the opening or the outlet is formed by the nozzle 13 or nozzle opening 13A.

The feed lines 9A, 9B, 9C preferably form no outlet for the nozzle lance 2 or have no outlet by which a fluid conveyed through the feed lines 9A, 9B, 9C can leave the nozzle lance 2 immediately or directly or without being mixed.

Preferably, the nozzle lance 2 or the nozzle head 12 comprises a holding piece 19.

Preferably, the holding piece 19 surrounds the nozzle head 12 in the circumferential direction at least substantially completely.

The nozzle head 12 is inserted into the holding piece 19 or is screwed or welded together with it, particularly in a fluid-tight manner.

Preferably, the nozzle lance 2 comprises a (third) tube 16C, which forms the feed line 9C and/or a sheath or an outer tube of the nozzle lance 2.

Preferably, the holding piece 19 is arranged on the tube 16C at the outlet end, in particular being screwed or welded together with it.

At the inlet end, the tube 16C is connected or can be connected to the supply line 8C or a first valve 10A.

Preferably, each of the tubes 16A, 16B, 16C is a tube 16 of the nozzle lance 2.

The valves 10A associated with the feed lines 9 and/or tubes 16 are preferably designed as control or regulating valves. Further, it is also possible for the valves 10A to impede a back flow of a fluid 5, 6 in the feed line 9 or the tube 16.

Furthermore, the feed lines 9, the mixing zone 14, the ducts 15A and/or the tubes 16 may be designed by their shape, dimensions and/or volumes to impede a back flow.

In the following, reference shall be made in particular to FIG. 4, which shows a second embodiment of the nozzle lance 2. Primarily, the differences from the first embodiment shall be explained, especially regarding the mixing piece 15 and the mixing zone 14. Descriptions of identical or similar features will not be repeated, so in this respect preceding remarks will also apply accordingly or supplementarily to the second embodiment.

In contrast with the first embodiment, in the second embodiment the feed lines 9 run coaxially, especially to the longitudinal axis L, so that a first feed line 9 surrounds a second feed line 9 and/or two feed lines 9 are arranged in one another. In particular, the feed line 9A is the first feed line 9 and the feed line 9B is the second feed line 9.

During operation of the nozzle lance 2, the active fluid 5 is taken in particular through the innermost feed line 9A and/or the added fluid 6 is taken through the feed line 9B surrounding the feed line 9A.

The feed lines 9, 9A, 9B are preferably fluidly connected to each other through mixing openings 17C in the wall of the inner feed line 9, 9A.

The (inner) feed line 9, 9A may have the mixing openings 17C on multiple sides and/or on each side.

Preferably, the mixing openings 17C are arranged only on an axial end section of the feed line 9, 9A, especially facing toward the mixing zone 14, intermediate part 15, and/or nozzle head 12. In particular, the mixing zone 14 comprises the mixing openings 17C.

The above remarks on the arrangement of the feed lines 9, 9A, 9B also preferably apply to the tubes 16, 16A, 16B.

In the second embodiment, the nozzle lance 2 may comprise a connection piece 20, which is situated in particular between the mixing piece 15 and the nozzle head 12 or joins these together.

Optionally, the connection piece 20 may (also) form the mixing zone 14.

The connection piece 20 may be inserted into the mixing piece 15 and/or the nozzle head 12 and/or be welded together with these, especially so that a tight fluid-tight connection results.

It is also possible for the connection piece 20 to be formed as a single piece with the mixing piece 15 and/or the nozzle head 12.

Preferably, the nozzle lance 2 in the second embodiment has no holding piece 19. In particular, the nozzle head 12 here takes over the function of the holding piece 19 and/or the nozzle head 12 comprises the holding piece 19.

Preferably, the tube 16 in the second embodiment is thus connected at the outlet end to the nozzle head 12. Preferably, the tube 16C is inserted into the nozzle head 12 or screwed or welded together with it, especially so that a tight fluid-tight connection is produced.

In general, especially in both the first and the second embodiment, the optional intermediate or swirling zone 25 can be situated or formed between the mixing zone 14 and the atomization zone 18, for example, by an annular groove, shoulder, enlargement of the flow cross section, a mixing element and/or the like, in order to bring about or (further) assist the blending of active fluid 5 and added fluid 6, especially preferably by generating turbulence, swirling, or the like. In this way, the liquid fluid mixture of the two fluids 5 and 6 can be mixed in a desired manner or sufficiently before the pressurized gas 7 is fed or an atomization and/or formation of a gas/liquid mixture occurs.

Preferably, the combustion plant 1 comprises a control system 24, in particular with the control system 24 designed to control the exhaust gas treatment. The control occurs in particular by control of the inflows, especially of the fluids 5 and 6, to the nozzle lances 2 and/or the pressure of the pressurized gas 7.

Preferably, the control system 24 comprises measuring devices 21, which are designed in particular to measure pressures. Preferably, the measuring devices 21 are designed to measure the pressure of the pressurized gas 7.

In particular, the measuring devices 21 associated with the pressurized gas feed line 9C may be manometers for pressure measurement, which may also be used as pressure regulators. Especially preferably, the pressure of the pressurized gas 7 can be measured and adjusted with the manometers.

Further, the measuring devices 21 may also be designed or serve for the measurement of inflows or inflow quantities, especially of the fluids 5, 6.

To simplify the representation, however, FIGS. 1 and 2 only show measuring devices 21 that are associated with the supply line 8C or feed line 9C for the pressurized gas 7.

It is also possible for the measuring devices 21 to comprise the valves 10 or for the measuring devices 21 to be multifunctional measuring/metering devices for simultaneous measurement and metering.

Preferably, the control system 24 thus comprises different measuring devices 21 or devices of different design.

Furthermore, the control system 24 preferably comprises one or more measuring devices 22 to measure a quantity or concentration of pollutants, especially nitrogen oxides $NO_x$ and/or sulfur oxides $SO_x$, in the exhaust gas A.

One or more measuring devices 22 may be provided, which are preferably situated in the smokestack of the combustion plant 1. The measuring devices 22 may be arranged at different heights in the smokestack or exhaust gas chamber 3 and/or on different sides of the smokestack or exhaust gas chamber 3. For simplicity, however, FIG. 2 shows only one measuring device 22. Optionally, each level E with nozzle lances 2 may have one or more measuring devices 22, which are arranged in particular on the wall 11 or in proximity to the wall 11.

Further, the control system 24 preferably comprises one or more thermometers 23 for measuring temperatures T, especially in the exhaust gas chamber 3.

Preferably, the thermometers 23 are arranged in the exhaust gas chamber 3, especially preferably at the height of the levels E.

Multiple thermometers 23 may be provided, which are arranged in particular at different heights in the exhaust gas chamber 3 and/or on different sides of the exhaust gas chamber 3. For simplicity, however, FIG. 2 shows only one thermometer 23.

In the context of the present invention, the term "thermometer" should preferably be understood broadly. In particular, by a thermometer is meant basically any device or any system designed or suitable to measure, detect or determine a temperature T in the exhaust gas chamber 3 during the operation of the combustion plant 1. In particular, it is also possible for the temperature T to be measured only indirectly, namely, in particular, to be determined from other measured values, especially by means of a formula and/or an algorithm, for example from the measurement of an (electromagnetic) wavelength or an acoustic velocity or the like.

Preferably, the thermometer 23 is or the thermometers 23 are formed by a system for acoustic gas temperature measurement and/or sonic pyrometry, or by one or more pyrometers or radiation thermometers.

Preferably, each nozzle lance 2, each supply line 8, each feed line 9, and/or each level E is respectively associated with a measuring device 21, a measuring device 22, a valve 10, and/or a thermometer 23. In particular, it is also possible for the nozzle lances 2 to each have one or more measuring devices 21, 22, valves 10 and/or thermometers 23.

Preferably, the measuring devices 21, 22 and/or thermometers 23 are designed to relay the signals measured by them and/or measured values ascertained by them to the control system 24.

Preferably, the control system 24 receives signals or measured values measured by the measuring devices 21, 22 and/or the thermometers 23, and/or the control system 24 processes these signals or measured values or the control system 24 is designed to do so.

Preferably, the control system 24 controls the valves 10, especially on the basis of these signals or measured values, especially with the inflows to the nozzle lances 2 and/or pressures of the pressurized gas 7 being controlled or adjusted. In particular, the valves 10 can thus be opened and/or closed with the control system 24.

The control system 24 is preferably designed to control the exhaust gas treatment or mixing of the fluid and/or delivery or addition of the active substance or active fluid 5 dependent on the temperature T in the exhaust gas chamber 3 as measured by the thermometer or thermometers 23. The combustion plant 1 or control system 24 is preferably designed to adjust or control the quantity and/or concentration of the active fluid 5 and/or active substance, especially the atomized fluid, on the basis of or dependent on the temperature T as measured by the thermometer or thermometers 23.

Preferably, the exhaust gas chamber 3 comprises various zones B or the exhaust gas chamber 3 is divided into various zones B, or various zones B are associated with the exhaust gas chamber 3. This is shown as an example in the schematic section per FIG. 5, which shows a modified embodiment of the combustion plant 1 and the exhaust gas chamber 3.

Figure 5:
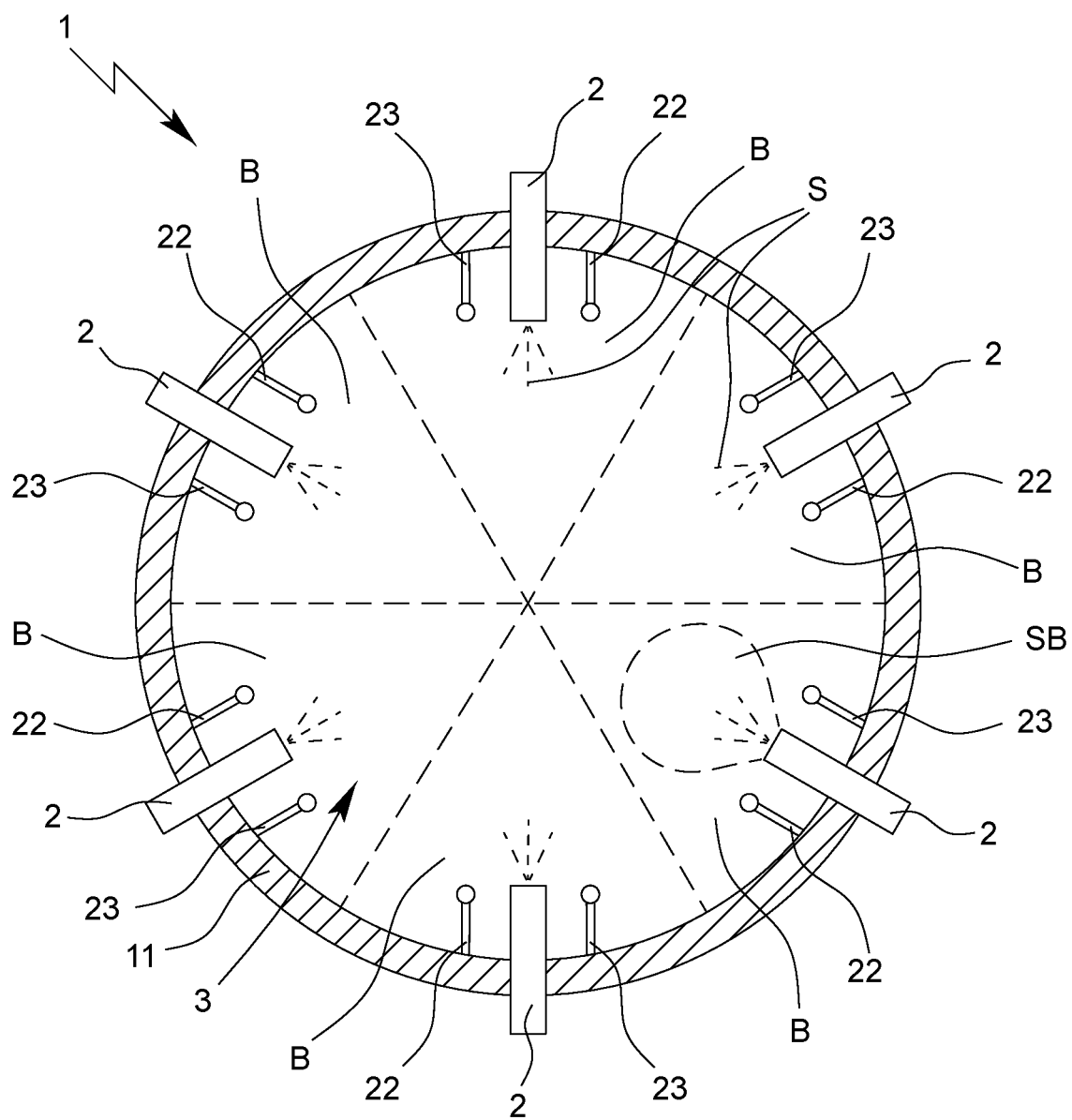
FIG. 5 shows a further schematic section through the exhaust gas chamber of a proposed combustion plant.

In the exemplary representation of FIG. 5, the zones B are sectors of an exhaust gas chamber 3, especially a cylindrical one. The zones B, however, may basically comprise or form any desired two-dimensional or three-dimensional shape.

Preferably, each zone B is a level E or a sector of a level E. Preferably, the zones B have an at least substantially two-dimensional or flat or layered design, and/or extend flat in the radial direction to the vertical and/or principal flow direction of the exhaust gas A being treated.

Preferably, each zone B is associated with a nozzle lance 2, a thermometer 23, and/or a measuring device 22 for measuring a quantity or concentration of pollutants, especially in the exhaust gas A. In particular, each zone B may comprise a nozzle lance 2, a thermometer 23, and/or a measuring device 22.

The combustion plant 1 is preferably designed to measure the temperature T in various zones of the exhaust gas chamber 3, especially by means of the thermometer 23 and/or the control system 24. Preferably, the measurement of the temperature T may occur in different zones B independently of each other.

Preferably, the combustion plant 1 is designed to adapt a quantity or concentration C of the active substance in the fluid or fluid mixture atomized or dispensed in the exhaust gas chamber 3 very quickly, i.e., with little dead time, preferably in less than 1 s, preferably in less than 0.1 s, especially preferably in less than 0.01 s, after the measurement of the temperature T. This is made possible in particular by the proposed nozzle lance 2. This point shall be discussed more closely below.

In a method for exhaust gas treatment in the combustion plant 1, a temperature T is preferably measured in the exhaust gas chamber 3 and in particular the quantity or concentration C of the active substance in the atomized fluid or fluid mixture is adjusted or controlled dependent on the measured temperature T.

The quantity or concentration C of the active substance in the atomized fluid or fluid mixture shall be called in the following the quantity or concentration C of the active substance, for short. These terms thus refer to the atomized or injected fluid or fluid mixture, unless otherwise mentioned.

The quantity or concentration C of the active substance is preferably adjusted, controlled or determined via the mix ratio between the active fluid 5 and the added fluid 6. As already described above, the active fluid 5 contains the active substance, i.e., for example ammonia, urea and/or a calcium-containing compound.

Preferably, the concentration C of the active substance in the active fluid 5 is constant or unchangeable, especially since the active fluid 5 is stored with the active substance in a tank 4, as explained above.

By the term "quantity" is preferably meant the absolute quantity of the active substance delivered or injected (into the exhaust gas chamber 3) per unit of time, for example in 1/min or kg/min, or an equivalent magnitude.

The volume flow of the dispensed fluid—the active fluid 5, the added fluid 6, or a mixture thereof, depending on the mix—and the volume flow or pressure of the pressurized gas 7 are preferably adjusted to the combustion plant 1 or the exhaust gas chamber 3 and the respective nozzle lance 2 or nozzle 3 or groups thereof and are preferably not changed during the operation of the combustion plant 1 or during the exhaust gas treatment procedure. Preferably, the concentration C or quantity of the active substance or the mix ratio of active fluid 5 to added fluid 6 is the sole parameter which is changed or can be changed during the procedure or during the exhaust gas treatment or the injection—especially individually for individual nozzles 13 or nozzle lances 2 or groups of nozzles 13 or nozzle lances 2.

Figure 6:
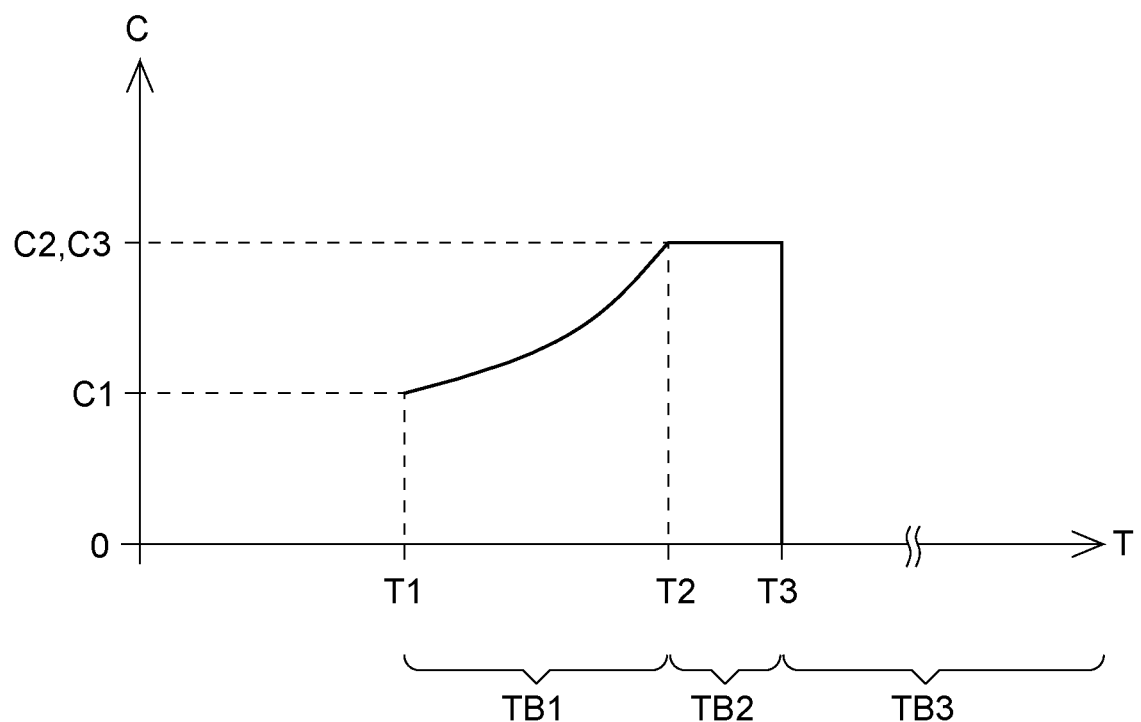
FIG. 6 shows a schematic representation of the dependency of the concentration of an active substance on a measured temperature.

As an example, FIG. 6 shows one possible (desirable) functional relationship between the concentration C of the active substance in the fluid injected or dispensed into the exhaust gas chamber 3 and the temperature T in the exhaust gas chamber 3, or the corresponding zone B of the exhaust gas chamber 3, or a dependency of the concentration C on the temperature T.

The (functional) relationship represented and described below between the concentration C of the active substance and the temperature T is preferably a target relation or a target curve to be achieved by the control process or by means of the control system 24 for exhaust gas treatment. Thus, the control process occurs preferably in such a way that the curve or functional relation between the concentration C and the measured temperature T as represented in FIG. 6 and/or described in the following is at least approximately achieved or realized.

Preferably, different relations between the concentration C and the temperature T exist at different temperatures T or in different temperature ranges TB. Thus, in different temperature ranges TB there will preferably be a different adaptation to the (measured) temperature T of the concentration C of the active substance delivered or injected into the exhaust gas chamber 3.

In the following, we shall discuss in particular three different temperature ranges TB1, TB2, TB3, denoted in order to distinguish them as the first, second and third temperature range TB1, TB2, TB3. This does not, however, imply any order of the temperature ranges TB, nor does it imply that three temperature ranges TB1, TB2, TB3 absolutely need to be present. In particular, it is also possible for only two temperature ranges TB to be present or for the control process to occur differently in only two temperature ranges TB, for example, in the manner described below for the first and third temperature range TB1 and TB3. The terms "first, second and third" temperature range TB1, TB2, TB3 are optional and may be exchanged as needed.

For the temperatures described below (first temperature T1, second temperature T2, and third temperature T3) and the concentrations associated with these temperatures (first concentration C1, second concentration C2, third concentration C3), the same applies as for the temperature ranges TB1, TB2, TB3.

Preferably, under rising temperature T, the quantity or concentration C of the active substance is increased. In other words, the concentration C is preferably monotonically or strictly monotonically rising as a function of the temperature T. This holds preferably at least or exclusively in a first temperature range TB1 between a first temperature T1 and a second temperature T2, preferably with T2>T1. The first temperature T1 and the second temperature T2 form the lower and upper limit temperature or the limits of the first temperature range TB1.

For example, an at least approximately linear, exponential, quadratic or other polynomial relationship may exist between the concentration C and the temperature T, especially in the first temperature range TB1. However, other functional relationships are also possible, such as an (at least approximately) logarithmic or radical dependency of the concentration C on the temperature T.

Preferably, the concentration C of the active substance has a value C1 at the first temperature T1, i.e., the functional relationship $C(T=T1)=C1$ obtains. In an analogous manner, the value of the concentration C at the second temperature T2 is denoted with the reference C2, so that: $C(T=T2)=C2$.

Preferably, the second concentration C2 is not equal to the first concentration C1, especially preferably it is greater than the first concentration C1 (C2>C1).

The first temperature T1 is preferably at least around 800° C. and/or at most around 880° C., especially preferably around 840° C. The first temperature T1 or lower limit temperature of the first temperature range TB1, however, may also be chosen to be significantly lower, in particular such that it corresponds to the minimum temperature T during the operation of the combustion plant 1.

The second temperature T2 preferably amounts to at least around 940° C. and/or at most around 1020° C., especially preferably around 980° C.

By increasing the concentration C during rising temperature T or decreasing the concentration C during falling temperature T, in particular the injection of too large a quantity of active substance into the exhaust gas chamber 3 can be changed. This will prevent a portion of the injected active substance from failing to react with the exhaust gas A or the pollutants. This surplus or unconsumed portion, also known as "slip," may cause an unwanted fouling of the combustion plant 1 or the exhaust gas chamber 3 with unconsumed active fluid 5 or unconsumed active substance. This slip can be prevented or at least reduced by the mentioned changing of the quantity or concentration.

Below the first temperature T1, the concentration C will preferably be (further) decreased and/or no active substance at all will be injected into the exhaust gas chamber 3 when the temperature T falls. Below the first temperature T1, however, the adjustment or control of the concentration C or quantity of the active substance can occur in the same way or in similar manner to that in the first temperature range TB1.

Preferably, a different adjustment or control of the concentration C of the active substance is done outside the first temperature range TB1 dependent on the temperature T than in the first temperature range TB1. Thus, outside the first temperature range TB1 a different functional relationship C(T) preferably exists between the concentration C and the temperature T than in the first temperature range TB1.

The further or second temperature range TB2 is bounded by the second temperature T2 and the further, third temperature T3, which is preferably higher than the second temperature T2 (T3>T2). The second and third temperatures T2, T3 form the lower and upper limit temperature or limits of the second temperature range TB2. The value of the concentration C at the third temperature T3 shall be denoted in the following by the reference C3, so that: $C(T=T3)=C3$.

Preferably, a different functional relationship C(T) between the concentration C and the temperature T exists in the second temperature range than in the first temperature range TB1.

Preferably, the temperature C in the second temperature range TB2 is at least substantially constant and/or the second and third concentration C2 and C3 are at least roughly equal in size (C2≈C3). However, it is also possible for a different, non-constant functional relationship C(T) to exist in the second temperature range TB2 between the concentration C and the temperature T. For example, the function C(T) might rise (monotonically) and/or fall (monotonically) with a lesser slope in the second temperature range TB2 than in the first temperature range TB1. Alternatively or additionally, for example, an at least approximately parabolic curve or a quadratic relationship between the concentration C and the temperature T is possible in the second temperature range TB2.

The third temperature T3 is preferably at least around 1000° C. and/or at most around 1080° C., especially preferably around 1040° C.

The third temperature T3 is preferably a lower limit or limit temperature of a third temperature range TB3. The temperature range TB3 is preferably half-open and/or not bounded by an upper limit temperature.

Preferably, the temperature T3 forms a limit temperature such that, when it is reached or surpassed, the quantity or concentration C of the injected active substance is reduced or no active substance is injected. Thus, preferably C(T>T3) <C3 or C(T>T3)=0. The function C(T) is preferably (strictly) monotonically falling and/or convergent, for example exponentially falling, to zero for T>T3 or in the third temperature range TB3. Preferably, the graph of the function C(T) has an inflection point at T=T3 or the function C(T) is not differentiable at T=T3. Alternatively or additionally, the function C(T) has a jump or a discontinuity at T=T3.

Alternatively to the represented function C(T), the concentration C may also decline at least approximately by a linear, exponential, quadratic or some other polynomial relationship at temperatures T>T3 or in the third temperature range TB3.

Preferably, upon a change in the temperature T or upon a temperature change in the exhaust gas chamber 3—especially in a zone B—the quantity or concentration C of the active substance in the atomized fluid or fluid mixture is adjusted or changed, especially to the altered temperature T—especially accordingly in this zone B or an associated spray zone SB.

Essentially, during the control or regulation process, an adjustment of the concentration C of the active substance in the atomized or injected fluid or fluid mixture cannot occur instantaneously; rather, a so-called dead time occurs between the time of the measurement or detection of the temperature change and the time at which the composition of the atomized fluid mixture or the concentration of the active substance in the injected fluid mixture—i.e., the fluid mixture delivered to the exhaust gas chamber 3 or zone B or SB—does (in fact) change.

Generally speaking, in feedback control technology the dead time is the span of time between a signal change at the system input and a corresponding signal response at the system output of a controlled system. In the present method, the signal change at the system input is the measuring or detecting of the temperature change and the signal response is the injecting of a fluid with altered composition into the exhaust gas chamber 3. Thus, the dead time here is the length of time between the measuring of the temperature change and the time at which the concentration C or quantity of the active substance changes in the fluid or fluid mixture injected or delivered to the exhaust gas chamber 3.

Preferably, the dead time for adjusting the quantity or concentration of the active substance in the atomized fluid mixture, especially in response to a change in the temperature T in the exhaust gas chamber 3, amounts to less than 1 s, especially preferably less than 0.1 s, especially less than 0.01 s. This is accomplished in particular by having the mixing of the added fluid 6 with the active fluid 5 (first) occur in the nozzle lance 2, especially in the mixing zone 14, or only just before the atomization or the atomization zone 18.

So short a dead time is made possible in particular by the mixing of the active fluid 5 with the added fluid 6 occurring only shortly or immediately before the atomization. Thus, only a very small "dead volume" is present in the nozzle lance 2, i.e., only a very small volume of the mixture of added fluid 6 and active fluid 5, which needs to be first delivered into the exhaust gas chamber 3 before a fluid mixture with a composition or concentration C or quantity of active substance that has been altered by a change in the mix ratio between active fluid 5 and added fluid 6 can be injected into the exhaust gas chamber 3. Preferably, the dead time depends substantially on the size of the dead volume, where a small dead volume results in a short dead time.

Accordingly, it is preferably for the nozzle lance 2 on the one hand to have a mixing zone 14 at first or upstream from the atomization zone 18 or for a mixing of the added fluid 6 with the active fluid 5 to occur here, and on the other hand for the mixing zone 14 to be only a slight distance away from the atomization zone 18, in particular a few centimeters.

In this way, on the one hand a good or defined blending of the active fluid 5 and the added fluid 6 to form the atomized fluid mixture can be achieved, and on the other hand a short dead time or rapid adjustment and thus an efficient exhaust gas cleaning can be achieved.

Preferably, the temperatures T in different zones B of the exhaust gas chamber 3 are measured or determined separately from each other.

Alternatively or additionally, it is also possible for the temperatures T in different spray zones SB or levels E to be measured separately from each other.

The spray zone SB of a nozzle lance 2 in particular is the zone which is reached or wetted (primarily) by the spray S delivered by the nozzle lance 2. This is shown schematically in FIG. 6.

Preferably, each nozzle lance 2 has a spray zone SB or each nozzle lance 2 is associated with a spray zone SB. The spray zones SB of different nozzle lances 2 are preferably separated from each other or form distinct zones, although they may also overlap.

Preferably, one or several spray zones SB or nozzles 13 or nozzle lances 2 are respectively associated with one or each (measuring) zone B.

Alternatively or additionally, the temperature T is measured in different levels E of the exhaust gas chamber 3. Preferably, the temperatures T are measured in different zones B or sectors of one level or each level E, especially separately from each other.

Alternatively or additionally, it may be provided that measurements of pollutant quantity or pollutant concentration are performed separately from each other in different zones B, levels E, and/or spray zones SB of the exhaust gas chamber 3.

However, the pollutant quantity or pollutant concentration can also be alternatively or additionally measured in different levels E of the exhaust gas chamber 3. Preferably, the pollutant quantity or pollutant concentration measurements are performed in different zones B or sectors of a level E, especially separately from each other.

In this way, it is possible to measure or determine, for individual nozzle lances 2 or for each nozzle lance 2, a temperature T and/or pollutant quantity or pollutant concentration associated with the respective nozzle lance 2, so that the mix ratio of added fluid 6 and active fluid 5 or the concentration C or quantity of the active substance in the fluid or fluid mixture atomized or delivered by the nozzle lance 2 is adjusted for each zone B, each spray zone SB, each level E, each sector and/or each nozzle lance 2, especially in a separate or individual manner.

In particular, it is also possible to measure the temperature in a zone B or spray zone SB and/or in a level E, whereby the adjustment of the quantity or concentration C of the injected active substance is undertaken in a different zone B or—possibly in addition—it is undertaken in a zone B in which the temperature T was not measured. In particular, the adjustment of the quantity or concentration C of the active substance may be done in a zone B on the basis of the temperature T measured in another zone B.

For example, it is possible to measure the temperature T in one level E and to inject only water or added fluid 6 as needed in a level E situated beneath it or upstream from it, in order to lower the exhaust gas temperature at first, especially to a temperature T beneath the third limit temperature T3 or second limit temperature T, so as to then inject active substance in the desired quantity or concentration C in the level E in which, or shortly before which, the temperature T is measured, thus carrying out or making possible an optimal exhaust gas treatment.

In addition to the already mentioned aspects and features, a method for exhaust gas treatment in the combustion plant 1 may have the following described aspects and features.

Preferably, the measuring devices 21, 22, the valves 10, the thermometer 23, and/or the control system 24 are calibrated, preset and/or adjusted to each other during an initial start-up of the combustion plant 1 and/or the nozzle lance 2.

Preferably, the control is provided by the control system 24 dependent on the temperatures T measured by the thermometers 23 and/or the quantities or concentrations of pollutants measured by the measuring devices 22, especially nitrogen oxides $NO_x$ and/or sulfur oxides $SO_x$.

Preferably, the control system 24 adjusts the quantity and/or the concentration of the active fluid 5, the added fluid 6, the fluid mixture 7, and/or the active substance, especially on the basis of these signals, preferably so that an optimal exhaust gas treatment or cleaning is done.

In particular, it is also possible not to mix in any added fluid 6 with the active fluid 5 and/or only to atomize the active fluid 5 by means of the pressurized gas 7. Preferably, this is done above the limit temperature or third temperature T3, and/or to cool down the flue gas or exhaust gas A.

The control by the control system 24 may in particular be done automatically—possibly after a calibration—with the control system 24 preferably having an appropriately designed computer or processor for this.

Preferably, the valves 10 or the nozzle lances 2 are adjusted or controlled individually, by zone and/or by level.

The control system 24 or the combustion plant 1 is preferably designed to adjust or control the mixing of the added fluid 6 in with the active fluid 5, especially the mix ratio between active fluid 5 and added fluid 6, for one or for each nozzle lance 2 and/or for one or for each level E individually or independently of other nozzle lances 2 and/or levels E.

Alternatively or additionally, it may be provided that the control system 24 or the combustion plant 1 is designed to adjust or control the addition of the pressurized gas 7 to the active fluid 5 and/or the added fluid 6, or to adjust or control the mix ratio between active fluid 5, added fluid 6, and/or pressurized gas 7, individually for one or for each nozzle lance 2 and/or for one or for each level E.

Preferably, the pressure of the pressurized gas 7 is adjustable by the control system 24.

Preferably, a pressure between 3000 hPa and 6000 hPa, especially between 4000 hPa and 5000 hPa, is used for optimal exhaust gas treatment.

Preferably, the properties of the generated aerosol or spray S, especially the throw distance and the droplet size, can be influenced or changed by the pressure of the pressurized gas 7.

Preferably, these variables can be adjusted or influenced alternatively or additionally by the shape and/or dimensioning of the nozzle lance 2, especially the nozzle 13.

Preferably the inflow of the active fluid 5 and/or added fluid 6 is adjusted and/or monitored via a mass flow, a volume flow, an absolute quantity and/or a quantity per unit of time of the respective fluid.

A mass flow, a volume flow, a concentration, an absolute quantity and/or a quantity per unit of time of the active substance is preferably adjusted and/or monitored. In particular, this can be done separately for each zone B, each spray zone SB, each level E, and/or each nozzle lance 2.

Especially preferably, the total quantity of the fluids 5 and 6 supplied to the nozzle lances 2 for the exhaust gas treatment is held substantially constant, so that only the mix ratio between the active fluid 5 and the added fluid 6 is changed.

Preferably, the pressure of the pressurized gas 7 is also held at least substantially constant. However, it is also possible to adapt the pressure to the total quantity of the fluids 5 and 6 supplied to the nozzle lances 2 or to the mix ratio of the fluids 5 and 6.

Especially preferably, the nozzle lance 2 or the combustion plant 1 is thus operated such that the most constant possible volume or mass flow of the fluids 5 and/or 6 is injected or atomized (regardless of their mix ratio), especially at the most constant possible pressure of the pressurized gas 7.

It is preferable for the quantity or the volume flow of the fluid or fluid mixture injected into the exhaust gas chamber 3 or delivered into the exhaust gas chamber 3 to be held constant and/or for only the mix ratio between active fluid 5 and added fluid 6 of the overall fluid delivered to the exhaust gas chamber 3 and/or delivered in particular to each individual nozzle lance 2 to be changed. Preferably, the quantity or concentration C of the injected active substance is adjusted or controlled as the only or exclusive variable, in particular adjusted upon temperature change and/or a change in the pollutant quantity or concentration.

Preferably, the inflow of the pressurized gas 7 is adjusted and/or monitored via a pressure of the pressurized gas 7.

Preferably, the adjusting of the valves 10 for each supply line 8, each feed line 9, each level E, each nozzle lance 2, and/or each nozzle lance group is done separately, individually and/or independently of the other supply lines 8, feed lines 9, levels E, nozzle lances 2 and/or nozzle lance groups.

Preferably, the combustion plant 1 or the control system 24 is designed to carry out a procedure for exhaust gas treatment with the above features.

The method for exhaust gas treatment or cleaning may also be a method for desulfurization or flue gas desulfurization. Basically, flue gas desulfurization differs from flue gas denitrification in that a different active fluid 5 or a different active substance is used. In particular, instead of an ammonia or urea solution, a liquid containing calcium or lime, such as lime water, is used, and/or the active substance contained in the active fluid 5 is in particular lime, calcium, calcium carbonate, calcium hydroxide or calcium oxide.

Accordingly, the measuring devices 22 are designed for the measurement of sulfur-containing compounds or sulfur oxides, especially sulfur dioxide $SO_2$ and/or sulfur trioxide $SO_3$.

| List of reference numbers: | |
|---|---|
| 1 | Combustion plant |
| 2 | Nozzle lance |
| 3 | Exhaust gas chamber |
| 4 | Tank |
| 5 | Active fluid |
| 6 | Added fluid |
| 7 | Pressurized gas |
| 8 | Supply line |
| 8A | Supply line for the active fluid |
| 8B | Supply line for the added fluid |
| 8C | Supply line for the pressurized gas |
| 9 | Feed line |
| 9A | Feed line for the active fluid |
| 9B | Feed line for the added fluid |
| 9C | Feed line for the pressurized gas |
| 10 | Valve |
| 10A | First valve |
| 10B | Second valve |
| 10C | Third valve |
| 11 | Wall |
| 12 | Nozzle head |
| 13 | Nozzle |
| 13A | Nozzle opening |
| 14 | Mixing zone |
| 15 | Mixing piece |
| 15A | Duct |
| 16 | Tube |
| 16A | Tube for the active fluid |
| 16B | Tube for the added fluid |
| 16C | Tube for the pressurized gas |
| 17A | Openings |
| 17B | Openings |
| 17C | Mixing openings |
| 18 | Atomization zone |
| 18A | Feed |
| 19 | Holding piece |
| 20 | Connection piece |
| 21 | Measuring device |
| 22 | Measuring device |
| 23 | Thermometer |
| 24 | Control system |
| 25 | Swirling zone |
| A | Exhaust gas |
| B | Zone |
| C | Concentration |
| C1 | (First) concentration |
| C2 | (Second) concentration |
| C3 | (Third) concentration |
| E | Level |
| L | Longitudinal axis |
| S | Spray |
| SB | Spray zone |
| T | Temperature |
| T1 | (First) temperature |
| T2 | (Second) temperature |
| T3 | (Third) temperature |
| TB1 | (First) temperature range |
| TB2 | (Second) temperature range |
| TB3 | (Third) temperature range |

The invention claimed is:

1. A method for exhaust gas treatment in a combustion plant, wherein a fluid mixture of an added fluid and an active fluid with an active substance, is injected by means of pressurized gas through multiple nozzles or nozzle lances into a common exhaust gas chamber of the combustion plant, wherein a temperature is measured in the exhaust gas chamber and a quantity or concentration of the active substance in the atomized fluid or fluid mixture is adjusted or controlled dependent on the measured temperature, wherein the quantity or concentration of the active substance is increased as the temperature rises in a first temperature range, and the quantity or concentration of the active substance is kept substantially constant as the temperature rises in a second temperature range.

2. The method according to claim 1, wherein the quantity or concentration of the active substance is increased as the temperature rises between around 800° C. and around 980° C.

3. The method according to claim 1, wherein the quantity or concentration of the active substance is kept substantially constant as the temperature rises between around 980° C. and around 1040° C.

4. The method according to claim 1, wherein the quantity or concentration of the injected active substance is reduced or no active substance is injected upon reaching or surpassing a limit temperature.

5. The method according to claim 1, wherein the limit temperature is at least around 980° C.

6. The method according to claim 1, wherein at least one of the total quantity of the fluids supplied to the nozzles or nozzle lances and the volume flow of the atomized fluid or fluid mixture is kept at least substantially constant regardless of the temperature measured.

7. The method according to claim 1, wherein the total quantity of the fluids supplied to the nozzles or nozzle lances or the volume flow of the atomized fluid or fluid mixture is kept at least substantially constant regardless of at least one of the mix ratio between added fluid and active fluid and the quantity or concentration of the active substance.

8. The method according to claim 1, wherein the quantity or concentration of the active substance in the atomized fluid mixture is adjusted or changed upon temperature change, while the dead time for adjusting the quantity or concentration of the active substance in the atomized fluid mixture is less than 1 s, the dead time being the time span between the measurement of the temperature change and the time at which the concentration or quantity of the active substance changes in the fluid or fluid mixture atomized or dispensed into the exhaust gas chamber.

9. The method of according to claim 8, while the dead time for adjusting the quantity or concentration of the active substance in the atomized fluid mixture is less than 0.1 s.

10. The method of according to claim 8, while the dead time for adjusting the quantity or concentration of the active substance in the atomized fluid mixture is less than 0.01 s.

11. The method according to claim 1, wherein the temperatures in different zones are measured separately of each other.

12. The method according to claim 1, wherein the quantity or concentration of the active substance in the atomized fluid or fluid mixture is adjusted separately for at least one of each zone, each level, each sector, and each nozzle lance.

13. The method according to claim 1, wherein the active fluid and the added fluid are mixed together inside the nozzle lances.

14. The method according to claim 1, wherein the active fluid and the added fluid are first mixed together and the pressurized gas is added to them only after that the mixing.

15. The method according to claim 1, wherein the pressurized gas is added to at least one of the active fluid and the added fluid inside the nozzle lance and/or before the atomization.

16. The method according to claim 1, wherein the active fluid is an ammonia solution or urea solution or contains ammonia or urea.

17. The method according to claim 1, wherein the fluid with the active fluid or active substance is injected in at least one of different zones and levels into the exhaust gas chamber via multiple nozzles or nozzle lances, wherein the quantity or concentration of the active substance in the fluid of individual or groups of nozzles or nozzle lances is individually set, adjusted, or varied.

18. The method according to claim 1, wherein the quantity or concentration of the active substance is increased as the temperature rises in a first temperature range between a first temperature and a second temperature, the second temperature being larger than the first temperature.

19. The method according to claim 1, wherein the quantity or concentration of the active substance is kept substantially constant as the temperature rises in a second temperature range bounded by the second temperature and a third temperature which is higher than the second temperature.

20. The method according to claim 1, wherein the concentration of the of the active substance is at least roughly the same at the second and third temperature.

21. The method according to claim 1, wherein the active fluid and the added fluid are mixed together inside the nozzle lances immediately before at least one of the atomization and injection.

22. The method according to claim 1, wherein the active fluid is an ammonia solution or urea solution, or contains ammonia or urea, wherein the added fluid is or contains water.

23. The method according to claim 1, wherein the fluid with the active fluid or active substance is injected in at least one of different zones and levels into the exhaust gas chamber via multiple nozzles or nozzle lances, wherein the quantity or concentration of the active substance in the fluid of individual or groups of nozzles or nozzle lances is individually set, adjusted, or varied, dependent on the temperature in at least one of the respective zone and the respective level.

24. The method according to claim 1, wherein the limit temperature is at least around 1000° C.

25. The method according to claim 1, wherein the limit temperature is at least around 1040° C.

26. The method according to claim 1, wherein the temperatures in different zones are measured separately of each other, in at least one of different levels and in different sections or sectors.

27. The method according to claim 1, wherein the temperatures in different zones are measured separately of each other, in at least one of different levels and in different sections or sectors of the same level.

\* \* \* \* \*